US010618366B2

(12) United States Patent
Pniewski et al.

(10) Patent No.: US 10,618,366 B2
(45) Date of Patent: Apr. 14, 2020

(54) VEHICLE AIR STRUT WITH TWIST LOCK CLOSURE COVER

(71) Applicant: Continental Automotive Systems, Inc., Auburn Hills, MI (US)

(72) Inventors: Garrett M. Pniewski, Bloomfield Hills, MI (US); Sunny Makkar, Troy, MI (US); Christian Schallmeier, Lake Orion, MI (US); Holger Wehaus, Hannover (DE)

(73) Assignee: Continental Automotive Systems, Inc., Auburn Hills, MI (US)

( * ) Notice: Subject to any disclaimer, the term of this patent is extended or adjusted under 35 U.S.C. 154(b) by 178 days.

(21) Appl. No.: 15/205,858

(22) Filed: Jul. 8, 2016

(65) Prior Publication Data

US 2018/0009283 A1 Jan. 11, 2018

(51) Int. Cl.
| | |
|---|---|
| *F16F 9/08* | (2006.01) |
| *F16F 9/32* | (2006.01) |
| *B60G 15/12* | (2006.01) |
| *F16F 9/04* | (2006.01) |
| *F16F 9/084* | (2006.01) |

(52) U.S. Cl.
CPC ............ *B60G 15/12* (2013.01); *F16F 9/0454* (2013.01); *F16F 9/084* (2013.01); *F16F 9/3207* (2013.01); *F16F 9/3271* (2013.01); *B60G 2202/314* (2013.01); *B60G 2204/126* (2013.01); *B60G 2204/128* (2013.01); *B60G 2206/424* (2013.01); *B60G 2206/82* (2013.01); *F16F 2226/04* (2013.01)

(58) Field of Classification Search
CPC ...... F16F 9/084; F16F 9/3207; F16F 2226/04; B60G 15/12; B60G 2202/128; B60G 2202/126
See application file for complete search history.

(56) References Cited

U.S. PATENT DOCUMENTS 3,169,292 A * 2/1965 Fenton ............... A44B 17/0029
24/619
4,146,258 A * 3/1979 Andruchiw ............ B65D 45/30
215/274

(Continued)

FOREIGN PATENT DOCUMENTS

| CN | 102009578 A | 4/2011 |
|---|---|---|
| CN | 104428558 A | 3/2015 |

(Continued)

OTHER PUBLICATIONS

Search Report dated Dec. 23, 2019 from corresponding DE application No. DE 10 2017 210 543.7.

*Primary Examiner* — Thomas J Williams
*Assistant Examiner* — James K Hsiao

(57) ABSTRACT

A pneumatic spring strut for a vehicle is provided including a hydraulic cylinder having a lower end for connection with a suspension system of the vehicle; a hydraulic piston slidably mounted within the hydraulic cylinder; a piston rod connected with the hydraulic piston; a pneumatic spring mount body connected with the hydraulic cylinder; a pneumatic spring bellows having a lower in connected with the pneumatic spring mount body; a top cap encircling the piston rod and being connected with a top end of the spring bellows, and a closing cover twist lock connected with the top cap.

14 Claims, 4 Drawing Sheets

(56) References Cited

U.S. PATENT DOCUMENTS

| | | | | |
|---|---|---|---|---|
| 4,746,106 A * | 5/1988 | Fukumura | F16F 9/468 | 267/218 |
| 5,009,401 A * | 4/1991 | Weitzenhof | B60G 15/14 | 188/321.11 |
| 5,172,999 A * | 12/1992 | Ijima | B60G 15/063 | 267/122 |
| 5,201,500 A * | 4/1993 | Ecktman | B60G 7/04 | 267/136 |
| 5,342,139 A * | 8/1994 | Hoffman | B60G 7/001 | 267/219 |
| 5,860,450 A * | 1/1999 | Trudeau | B60G 17/0525 | 137/627.5 |
| 6,024,343 A * | 2/2000 | Ebert | B60G 11/28 | 267/124 |
| 6,148,780 A * | 11/2000 | O'Neill | F01L 1/053 | 123/90.46 |
| 6,199,844 B1 * | 3/2001 | McCormick | B60G 13/003 | 267/140 |
| 6,398,179 B1 * | 6/2002 | Soles | B60G 11/28 | 248/222.51 |
| 6,572,089 B2 * | 6/2003 | Zietsch | B60G 13/003 | 267/195 |
| 7,252,059 B2 * | 8/2007 | Abbott | F01L 1/34 | 123/195 C |
| 7,959,138 B2 * | 6/2011 | Leonard | F16L 37/008 | 267/122 |
| 8,070,144 B2 * | 12/2011 | Lamb | B60G 11/22 | 267/220 |
| 8,336,686 B2 * | 12/2012 | Handke | B60G 13/003 | 188/297 |
| 8,474,798 B2 * | 7/2013 | Jeischik | B60G 15/14 | 267/122 |
| 9,127,701 B2 * | 9/2015 | Tung | F16B 2/065 | |
| 2002/0011697 A1 | 1/2002 | Pesch et al. | | |
| 2004/0119212 A1 * | 6/2004 | Gleu | F16F 9/05 | 267/64.11 |
| 2004/0119250 A1 | 6/2004 | Rehra et al. | | |
| 2004/0168871 A1 * | 9/2004 | Handke | B60G 15/062 | 188/322.12 |
| 2004/0222576 A1 * | 11/2004 | Oldenettel | B60G 15/14 | 267/64.19 |
| 2005/0236748 A1 * | 10/2005 | Gross | F16F 9/057 | 267/64.27 |
| 2010/0181515 A1 * | 7/2010 | Berger | F01L 1/143 | 251/318 |
| 2011/0140323 A1 | 6/2011 | Kwon | | |
| 2012/0241267 A1 * | 9/2012 | Muraguchi | F16F 9/38 | 188/322.12 |
| 2013/0009351 A1 * | 1/2013 | Renard | F16F 13/14 | 267/140.12 |
| 2013/0277898 A1 * | 10/2013 | Vartolo | B60G 13/003 | 267/66 |
| 2014/0239567 A1 * | 8/2014 | Suchta | B60G 15/061 | 267/220 |
| 2015/0091257 A1 * | 4/2015 | Matsumura | F16F 9/38 | 277/636 |
| 2015/0159725 A1 | 6/2015 | Gleu | | |
| 2015/0328947 A1 * | 11/2015 | Kawahara | F16F 9/38 | 267/221 |
| 2016/0023529 A1 * | 1/2016 | Wilkin | F16F 1/12 | 267/221 |
| 2016/0108985 A1 * | 4/2016 | Pniewski | F16F 9/057 | 267/64.24 |
| 2016/0144683 A1 | 5/2016 | Schallmeier et al. | | |

FOREIGN PATENT DOCUMENTS

| | | |
|---|---|---|
| DE | 3619942 A1 | 12/1987 |
| DE | 19719301 A1 | 11/1998 |
| DE | 10037026 C1 | 11/2001 |
| DE | 10257008 A1 | 6/2004 |
| DE | 102007049684 B3 | 6/2009 |
| EP | 2775162 A2 | 9/2014 |

* cited by examiner

VEHICLE AIR STRUT WITH TWIST LOCK CLOSURE COVER

FIELD OF THE INVENTION

The present invention relates to suspension systems for automotive vehicles. More particularly the field of the present invention relates to air struts for automotive vehicles.

BACKGROUND OF THE INVENTION

Many premium automotive vehicles with front wheel drive have air strut suspensions on their front corners. An air strut is basically a hydraulic shock absorber that has an air spring mounted in parallel. A hydraulic cylinder of the shock absorber has a bottom end configured for connection with a suspension component of the vehicle wheel. A piston rod extends vertically upward out of a top end of the shock absorber hydraulic cylinder. A top end of the piston rod of the hydraulic shock absorber is connected with an elastomeric bushing.

The top end of the hydraulic cylinder of the shock absorber is connected with a lower end of an air spring bellows. An upper end of the bellows is connected with a top cap. An upper end of the top cap has an outer radial flange for connection with the vehicle body. The top cap has a lower radially inward directed flange with a central opening that the piston rod extends through. The aforementioned bushing rests on top of the top cap lower flange. To cover the bushing and to seal the air spring formed by air spring bellows, there is provided a closure cover. Typically the closure cover is held in place in the top cap by a steel washer which is secured in position by a locking ring. The locking ring is fitted within a groove on an inner diameter of the top cap. To prevent moisture from the environment from damaging the locking ring the aforementioned washer is typically covered with a rubber boot. To save weight, often the top cap or the closure member is fabricated from aluminum. Since the top cap, closure member, and locking ring (typically fabricated from steel) are often fabricated from dissimilar metallic materials, relatively expensive terostat coatings may be required to prevent galvanic corrosion. It is desirable to provide an automotive air strut with a closure member configuration that does not require expensive coatings to prevent galvanic corrosion. It is desirable to provide an automotive air strut with a closure member configuration that does not require a rubber boot. It is desirable to provide an automotive air strut with a twist lock connected closure member. It is desirable to provide an automotive air strut that reduces the number of required parts and is simpler than those previously provided.

SUMMARY OF THE INVENTION

To make manifest the above noted and other desires, a revelation of the present invention is brought forth. The present invention in a preferred embodiment endows a freedom of a pneumatic spring strut for a vehicle that includes a hydraulic cylinder having a lower end for connection with a suspension system of the vehicle. A hydraulic piston slidably mounted within the hydraulic cylinder is provided, having a connected piston rod. A pneumatic spring mount body is provided that is connected with the hydraulic cylinder. A pneumatic spring bellows is provided, having a lower end connected with the pneumatic spring mount body. A top cap is provided that encircles the piston rod. The top cap is connected with a top end of the spring bellows. The top cap has an outer flange for connection with a body of a vehicle. The top cap has a bore having a lower radially inward projecting flange and an upper opening with radially inward projecting spline teeth. A bushing is provided that is connected with the piston rod. The bushing is positioned above and against the top cap lower flange. A twist lock closing cover is provided that has a body that can be twist lock connected with the top cap.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
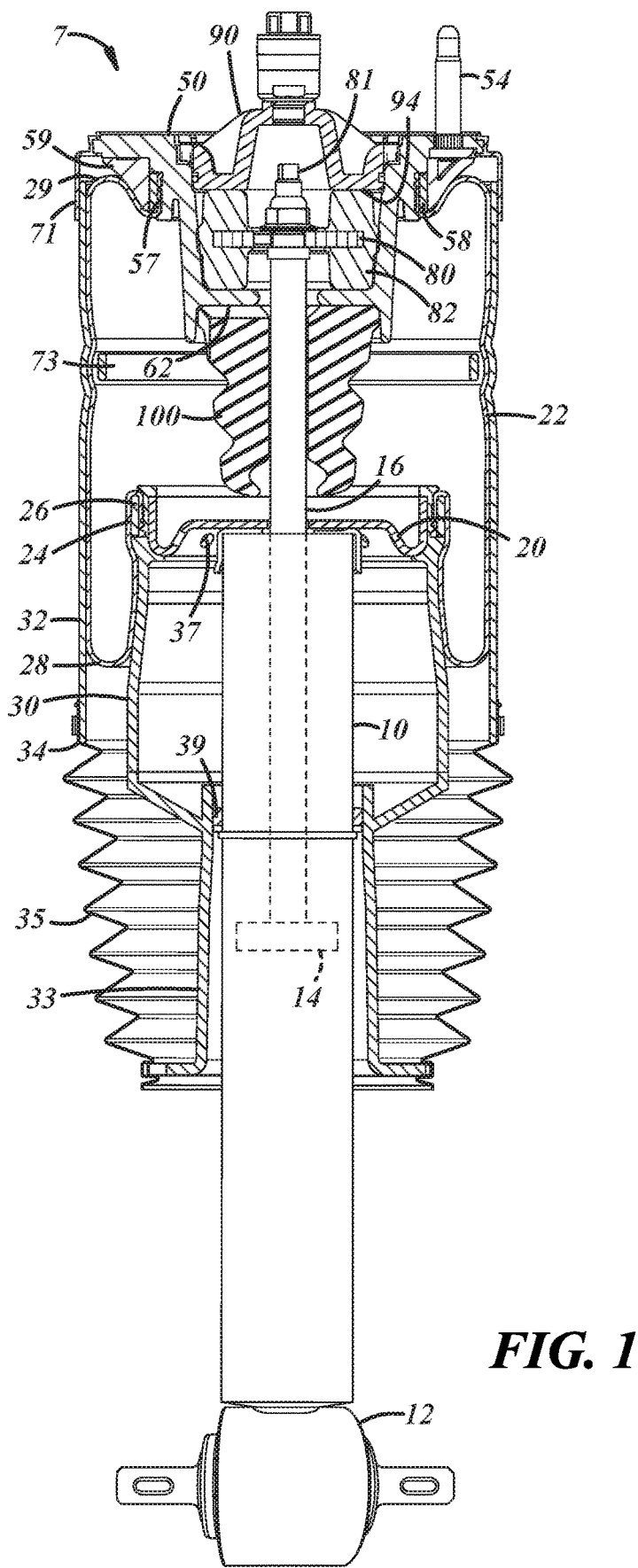
FIG. 1 is a sectional view of a preferred embodiment air strut according to the present invention.
Figure 2:
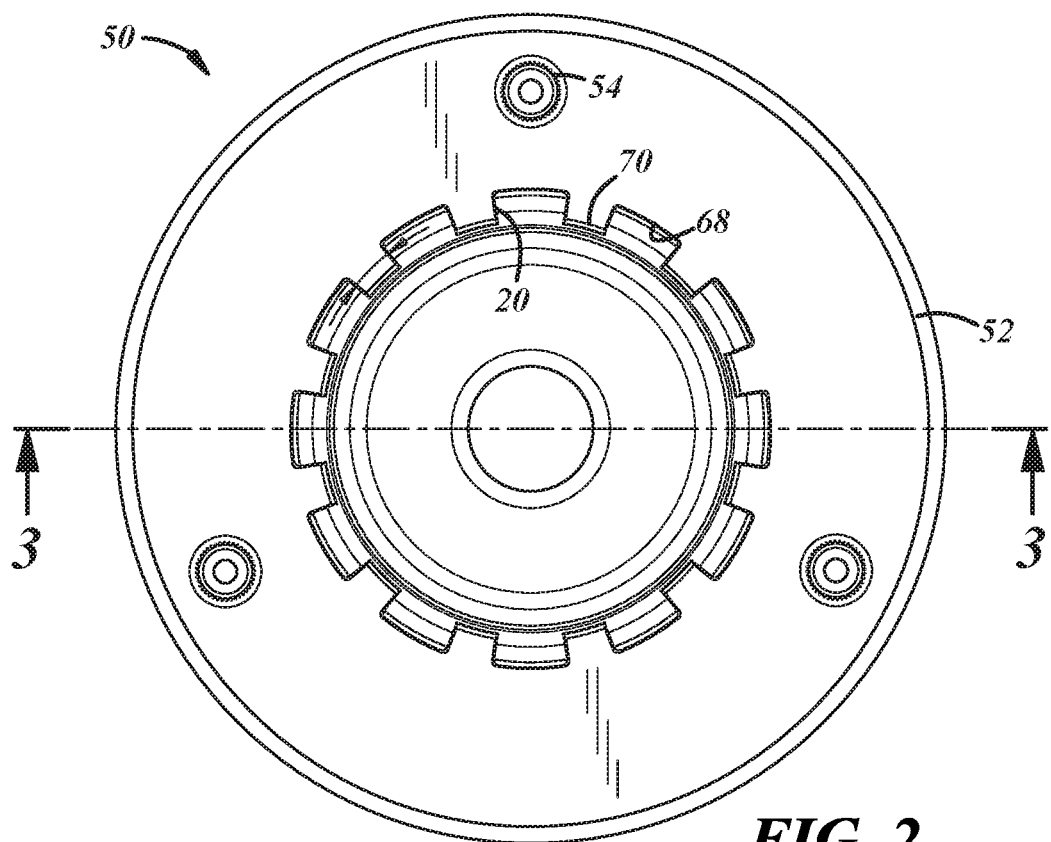
FIG. 2 is an enlarged top plane view of a top cap of the air strut shown in FIG. 1.
Figure 3:
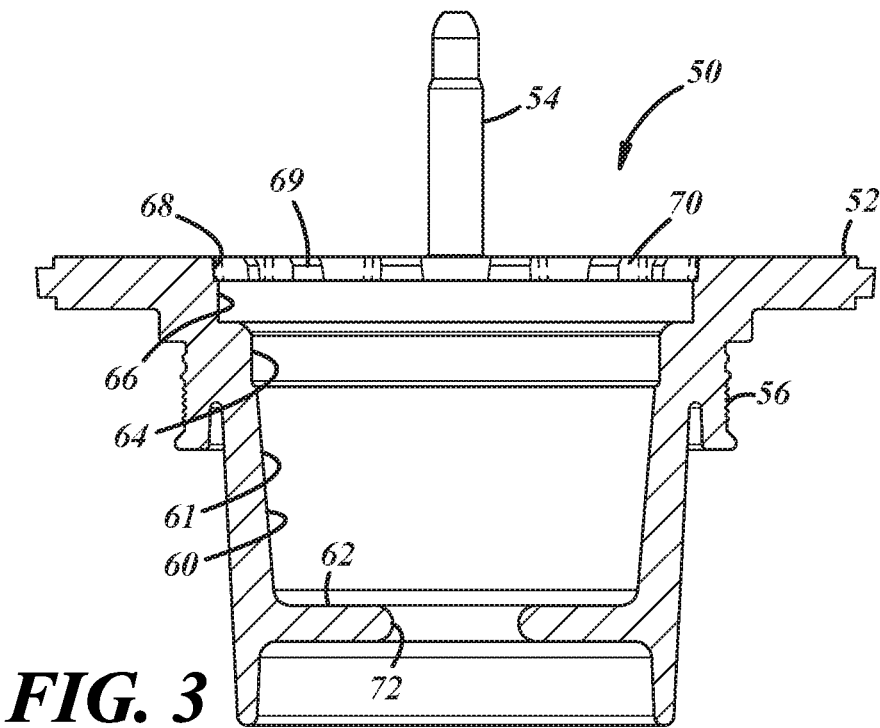
FIG. 3 is a sectional view of the top cap shown in FIGS. 1 and 2.
Figure 4:
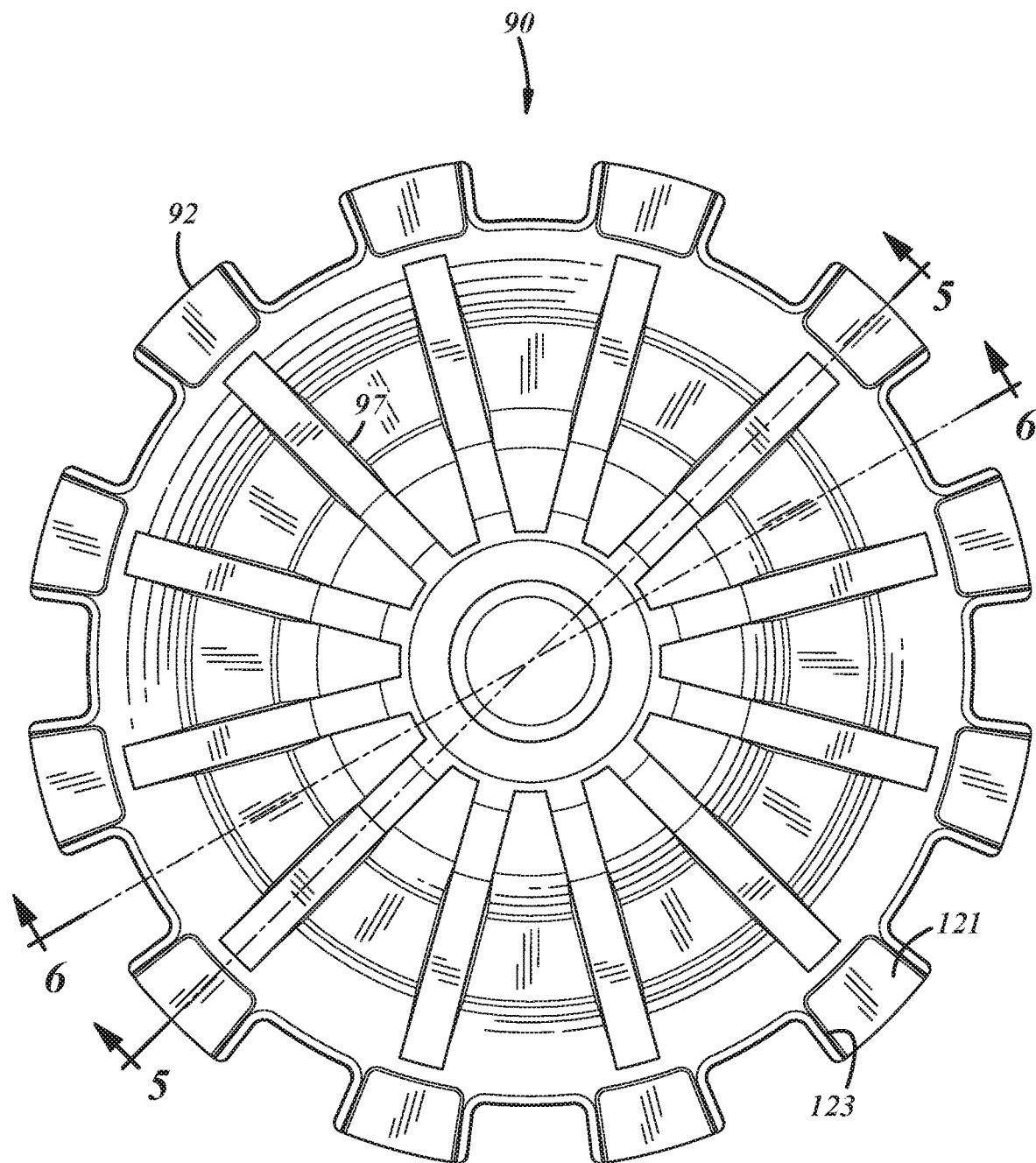
FIG. 4 is an enlarged top plane view of a closing cover of the air strut shown in FIG. 1.
Figure 5:
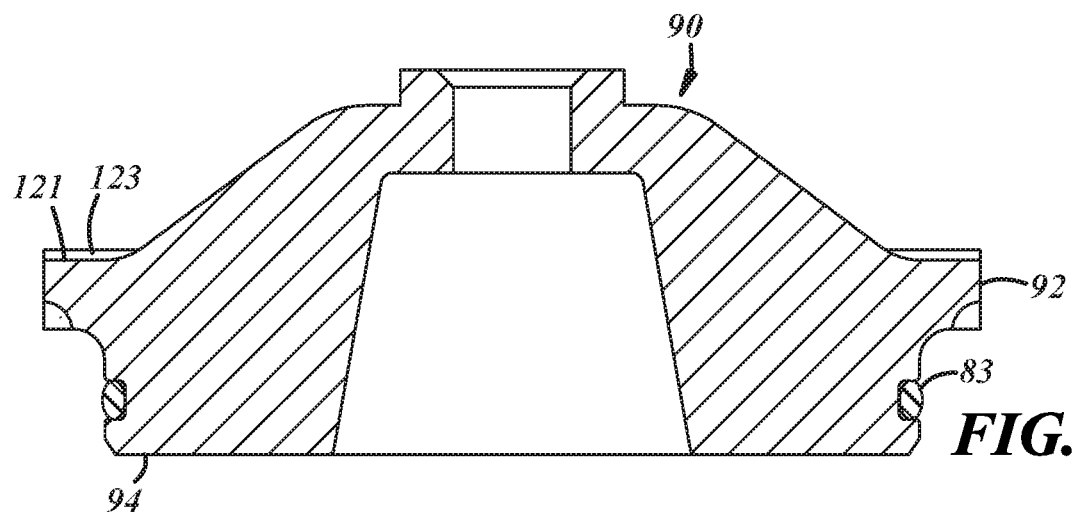
FIG. 5 is a reduced sectional view taken along lines 4-4 of FIG. 4 of the closing cover of FIG. 4.
Figure 6:
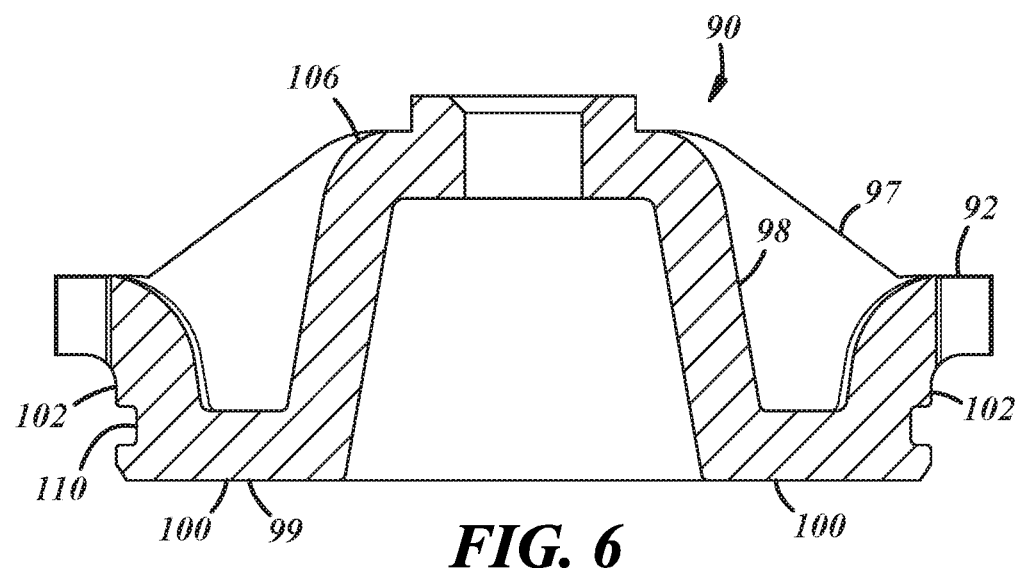
FIG. 6. is a reduced sectional view taken along lines 6-6 of the closing cover of FIG. 4.
Figure 7:
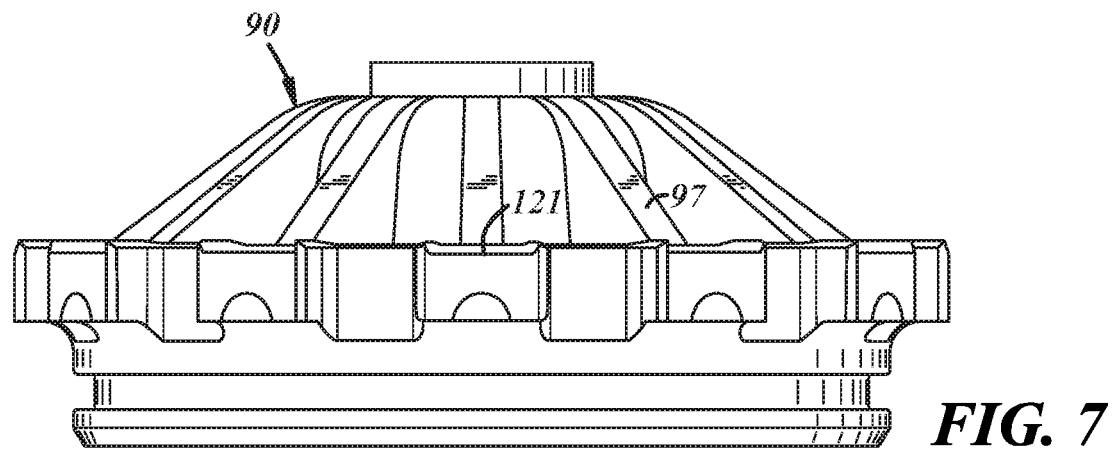
FIG. 7 is a side plane view of the closing cover shown in FIGS. 5 and 6.

Referring to FIGS. 1 through 7, a pneumatic spring vehicle strut 7 according to the present invention is provided. This type of strut is particularly useful in premium passenger vehicles in front wheel drive applications. The strut 7 has a hydraulic cylinder 10. The hydraulic cylinder 10 has a lower end 12 adapted for connection with a suspension system of a vehicle (not shown). Slidably mounted within the hydraulic cylinder 10 is a piston 14 (shown schematically). A piston rod 16 is connected with the piston 14. A pneumatic spring mount 20 is fixedly connected with the hydraulic cylinder 10.

The pneumatic spring strut 7 is provided with a spring bellows 22. The spring bellows 22 has a lower end 24 that is captured to the spring mount 20 by a retainer ring 26. A lower fold 28 of the spring bellows 22 is retained on its inner side by a pneumatic piston 30 and is retained on its outer side by a spring cover 32. A bottom portion 33 of the pneumatic piston 30 connects with an expansion boot 35, which in turn is connected with a lower end 34 of the spring cover 32. A series of holes 37 defined in the spring mount 20 allow air to communicate between an inside the spring bellows 22 and an interior of the pneumatic piston 30. A seal 39 seals a lower end of pneumatic piston's 30 interior space.

The pneumatic spring strut 7 is provided with a top cap 50. The top cap 50 is typically fabricated from steel, aluminum, plastic, or a combination of materials. The top cap 50 has an outer flange 52. The outer flange 52 allows the strut 7 to be boltably connected with a vehicle body strut tower (not shown) by three bolt fasteners 54. The top cap 50 along a radial outer side has a ribbed portion 56. A retainer ring 58 captures a top portion 57 of the spring bellows to sealably connect the spring bellows 22 with the ribbed portion 56 of the top cap 50. A forming ring 59 is provided on an underside of the top cap 50 flange 52. A top fold 29 of the spring bellows 22 is shaped by and abuts the forming ring 59. The forming ring 59 surrounds the retainer ring 58.

The top cap 50 has a multi-diameter inner bore 60. The top cap bore has a slightly inclined portion 61 to provide for tool draft. The inner bore 60 has a radially inward projecting flange 62. The top cap 50 inner bore 60 has a sealing diameter portion 64. Next to sealing diameter portion 64 is an annular groove 66. The top cap 50 inner bore 60 has a splined opening 68 having radially inward projecting spline teeth 70. The spline teeth 70 are cantilevered over annular groove 66 and have a tooling taper 69 on their tip. The top cap 50 inward projecting flange 62 has an opening 72 allowing for the extension of the piston rod 16 to extend therethrough. A dust boot prevents entrance of dirt between the top cap 50 and the spring cover 32. An intermediate retainer ring 73 holds a mid-portion of the spring bellows 22 to the spring cover 32. Connected underneath the top cap 50 is a rubber bumper 100 which acts as a joist bumper to limit movement of the vehicle frame (not shown) in a direction towards the hydraulic cylinder lower end 12.

A steel washer 80 is retained to an end of the piston rod by a nut 82. The washer 80 provides a mounting for a compressible rubber damper bushing 82. A bottom end of the bushing 82 is adjacent to the radially inward projecting flange 62 of the top cap.

A polymeric (preferably Nylon fiber reinforced material) twist lock closing cover 90 is provided. The closing cover 90 has an annular groove 110 to accept a ring sealing member 83 to seal against the sealing portion 64 of the top cap. The closing cover 90 has a central conic hollow dome 98 with a flange 99 formed by a horizontal radially outward extending base 100 with a generally axially extending rim portion 102. The axially extending rim portion 102 is connected with the gear-like teeth 92. The gear-like teeth 92 allow the closure cover 90 to be inserted in the splined opening 68 of the top cap 50 to fit within the top cap 50 annular groove 66. Preferably there are at least four gear-like teeth 92. The closing cover 90 has radial ribs 97. The gear-like teeth 92 are aligned with the radial ribs 97.

The ribs 97 join an upper portion 106 of the conical dome 98, to the base portion 100 of the flange 99 as well as to the axially extending rim portion 102. During assembly of the closure cover 90 to a remainder of the pneumatic spring strut 7, the gear like teeth 92 of the closure cover 90 are aligned with the top cap 50 splined opening 68. A bottom surface of the radially outward extending base 100 is used to compress a top of the bushing 82. The closing cover 90 is then turned to present its gear-like teeth 92 to be positioned underneath the spline teeth 70 of the top cap 50. The compressive force on the bushing 82 is ceased. The above action causes the closing cover 90 to be resiliently pushed upward by the bushing 82 and to be captured to the top cap 50 thereby arresting the damper bushing 82 against the top cap inner flange 62 thereby connecting the piston rod 16 to the top cap 50.

The gear-like teeth 92 of the closing cover 90 have a depression 121 with sides 123 to receive and radially capture an underside of the closing cover spline teeth 70. The positioning of the top cap spline teeth 70 within the gear-like teeth 92 depression 121 inhibits rotation of the closing cover 90 thereafter locking the closure cover 90 in place, preventing inadvertent release of the closure cover 90 upon operation of the strut 7 during vehicle operation.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A pneumatic spring strut for a vehicle comprising:
a hydraulic cylinder having a lower end for connection with a suspension system of the vehicle;
a hydraulic piston slidably mounted within said hydraulic cylinder;
a piston rod connected with said hydraulic piston;
a pneumatic spring mount body connected with said hydraulic cylinder;
a pneumatic spring bellows having a lower end connected with said pneumatic spring mount body;
a top cap encircling said piston rod and being connected with a top end of said spring bellows, said top cap having an outer flange for connection with a body of said vehicle, and said top cap having a bore having a lower radially inward projecting flange and an upper opening with radially inward projecting spline teeth;
a bushing connected with said piston rod positioned above and against said top cap lower flange; and
a closing cover having a body fit within said top cap bore upper opening and rotatable to lock within said top cap bore upper opening.

2. The pneumatic spring strut of claim 1 wherein said closing cover body has an outer flange with teeth that fit within splined openings between spline teeth of the top cap.

3. The pneumatic spring strut of claim 2 wherein the closing cover has ribs aligned with said teeth.

4. The pneumatic spring strut of claim 2 wherein said closing cover teeth have a depression for receipt of the top cap spline teeth.

5. The pneumatic spring strut of claim 1 wherein said closing cover is fabricated from a polymeric material.

6. The pneumatic spring strut of claim 1 wherein said bore of said top cap is tapered.

7. The pneumatic spring strut of claim 1 wherein said closing cover is sealed with said top cap by a sealing member provided an annular groove of said closing cover.

8. The pneumatic spring strut of claim 1 wherein said top cap is fabricated from a group of materials including steel, aluminum, plastic, or a combination thereof.

9. The pneumatic spring strut of claim 1 wherein said closing cover has a hollow conic central dome connected with a horizontal base, said horizontal base being connected with an axial rim and said closing cover having ribs connecting said dome, said base and said axial rim.

10. The pneumatic spring strut of claim 9 wherein said closing cover ribs are connected with an upper portion of said closing cover hollow conic central dome.

11. The pneumatic spring strut of claim 1 wherein, including at least one threaded fastener extending upward from the outer flange of the top cap, the at least one threaded fastener for connection with the body of the vehicle.

12. A pneumatic spring strut for a vehicle comprising:
- a hydraulic cylinder having a lower end for connection with a suspension system of the vehicle;
- a hydraulic piston slidably mounted within said hydraulic cylinder;
- a piston rod connected with said hydraulic piston;
- a pneumatic spring mount body connected with said hydraulic cylinder;
- a pneumatic spring bellows having a lower end connected with said pneumatic spring mount body;
- a top cap encircling said piston rod and being connected with a top end of said spring bellows, said top cap having an outer flange for connection with a body of said vehicle, and said top cap having a bore having a lower radially inward projecting flange and an upper opening with radially inward projecting spline teeth;
- a bushing connected with said piston rod positioned above and against said top cap lower flange; and
- a polymeric closing cover having a body with an outer flange with at least four teeth, said closing cover teeth having an upper depression for reception of said top cap spline teeth, said closing cover being fit within said top cap bore upper opening, and said closing cover can be turned and captured underneath said top cap bore upper opening spline teeth to arrest said damper bushing against said top cap lower flange, said closing cover having a central conic hollow dome with an outer flange formed by a horizontal base connecting with a generally axially extending rim, said rim being connected with said teeth, and said closing cover having radial ribs connecting a top portion of said dome, said horizontal base and said rim and being aligned with said spline teeth.

13. The spring pneumatic strut of claim 12, wherein said top cap is fabricated from aluminum.

14. A method of connecting a closing cover on pneumatic spring strut for a vehicle comprising:
- providing a hydraulic cylinder having a lower end for connection with a suspension system of the vehicle;
- providing a hydraulic piston slidably mounted within said hydraulic cylinder;
- providing a piston rod connected with said hydraulic piston;
- connecting with said hydraulic cylinder a pneumatic spring mount body;
- connecting with said pneumatic spring mount body a lower end of a pneumatic spring bellows;
- providing a top cap encircling said piston rod and connecting said top cap with an upper end of said spring bellows, said top cap having an outer flange for connecting with a body of said vehicle, and said top cap having a bore having a lower radially inward projecting flange and an upper opening with radially inward projecting spline teeth;
- connecting with said piston rod a bushing positioned above and against said top cap lower flange;
- providing a closing cover having a body with an outer flange with teeth;
- fitting said closing cover within said top cap bore upper opening;
- compressing said bushing with said closing cover; and
- turning said closing cover to capture said closing cover underneath said top cap bore upper opening spline teeth and thereafter ceasing the compressing of said bushing by said closing cover to arrest said damper bushing against said top cap lower flange.

* * * * *